US011282388B2

(12) United States Patent
Kan et al.

(10) Patent No.: US 11,282,388 B2
(45) Date of Patent: Mar. 22, 2022

(54) EDGE-ASSISTED ALERT SYSTEM

(71) Applicant: Toyota Motor Engineering & Manufacturing North America, Inc., Plano, TX (US)

(72) Inventors: Xinyue Kan, Moreno Valley, CA (US); Akila C. Ganlath, Agua Dulce, CA (US); Ahmed H. Sakr, Mountain View, CA (US); Prashant Tiwari, Santa Clara, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 70 days.

(21) Appl. No.: 16/779,100

(22) Filed: Jan. 31, 2020

(65) Prior Publication Data
US 2021/0241624 A1 Aug. 5, 2021

(51) Int. Cl.
*G08G 1/16* (2006.01)
*G07C 5/08* (2006.01)
*H04W 4/44* (2018.01)
*G08G 1/01* (2006.01)

(52) U.S. Cl.
CPC ............ *G08G 1/164* (2013.01); *G07C 5/085* (2013.01); *G08G 1/0129* (2013.01); *G08G 1/0133* (2013.01); *H04W 4/44* (2018.02)

(58) Field of Classification Search
CPC .... G08G 1/164; G08G 1/0133; G08G 1/0129; G07C 5/085; H04W 4/44
See application file for complete search history.

(56) References Cited

U.S. PATENT DOCUMENTS

| 8,849,557 | B1 | 9/2014 | Levandowski et al. |
| 10,007,513 | B2 | 6/2018 | Malladi et al. |
| 10,254,763 | B2 | 4/2019 | Tatourian et al. |
| 10,317,907 | B2 | 6/2019 | Shami |
| 2014/0272811 | A1 | 9/2014 | Palan |
| 2015/0262486 | A1 | 9/2015 | Bahl et al. |
| 2016/0357262 | A1 | 12/2016 | Ansari |
| 2018/0255082 | A1 | 9/2018 | Ostergaard |

(Continued)

OTHER PUBLICATIONS

"Camera-enabled V2X for public transportation and emergency vehicles", FLIR Systems, Inc., http://www.flirmedia.com/MMC/CVS/Traffic/18-0585_EN.pdf, Mar. 20, 2018, 4 pages.

(Continued)

*Primary Examiner* — Hongmin Fan
(74) *Attorney, Agent, or Firm* — Christopher G. Darrow; Darrow Mustafa PC

(57) ABSTRACT

An edge device can send a vehicle-specific alert to a connected vehicle, which is configured to communicate with the edge device. The edge device can receive observations of other vehicles on the road from connected vehicles and/or roadside units. The edge device can also receive driving history and/or other information about the other vehicles from a server. The edge device can classify the behavior of vehicles detected in the observations based on the observations, driving history, and/or other information. Based on the classified behavior, the edge device can determine whether and how the connected vehicle is impacted and, if impacted, send the vehicle-specific alert to the connected vehicle.

20 Claims, 11 Drawing Sheets

(56) References Cited

U.S. PATENT DOCUMENTS

| | | |
|---|---|---|
| 2019/0028862 A1 | 1/2019 | Futaki |
| 2019/0156668 A1* | 5/2019 | Liang .................... H04W 4/38 |
| 2020/0192355 A1* | 6/2020 | Lu ....................... G08G 1/0129 |
| 2020/0239031 A1* | 7/2020 | Ran ..................... G08G 1/0112 |
| 2021/0150895 A1* | 5/2021 | Huang ................ G08G 1/0133 |

OTHER PUBLICATIONS

Zhang J. et al., "Mobile Edge Intelligence and Computing for the Internet of Vehicles", http://arxiv.org/pdf/1906.00400.pdf, Jun. 2, 2019, pp. 1-18.

Huang, R. et al., "Mobile Edge Computing-Based Vehicular Cloud of Cooperative Adaptive Driving for Platooning Autonomous Self Driving," 2017 IEEE 7th International Symposium on Cloud and Service Computing (SC2), Kanazawa, 2017, pp. 32-39.

* cited by examiner

800

```
Acquiring observations of at least one or more vehicles
on a road
810
```
↓
```
Transmitting observations of the at least one or more
vehicles
820
```

FIG. 8

EDGE-ASSISTED ALERT SYSTEM

FIELD

The subject matter described herein relates in general to vehicles and, more particularly, to assisting vehicles or vehicle drivers in decision-making.

BACKGROUND

Some vehicles are equipped with sensors that can acquire information about the surrounding environment. Such information can be used for various purposes, such as detecting the presence of other vehicles on the road. In some instances, information acquired by the sensors can be used to determine how to operate the vehicle. Alternatively, a vehicle computing system can use the information to determine how to navigate and/or maneuver the vehicle through the surrounding environment.

SUMMARY

In one respect, the subject matter presented herein relates to an edge-assisted alert method. The method can include acquiring, by an edge device, observations from one or more connected vehicles or one or more roadside units about one or more vehicles on a road. The method can include classifying, using the edge device, a behavior based on the acquired observations of one or more of the one or more vehicles on the road. The method can further include determining, using the edge device, an impact of the classified behavior on a connected vehicle. The method can include sending, using the edge device, an alert about the impact to the impacted connected vehicle.

In another respect, the subject matter presented herein relates to an edge-assisted alert system. The system can include at least one of one or more connected vehicles or one or more roadside units. The system can include one or more edge devices operatively connected to the at least one of one or more connected vehicle or one or more roadside units. The one or more edge devices can be configured to acquire observations from the one or more connected vehicles or the one or more roadside units about one or more vehicles on a road. The one or more edge devices can be configured to classify a behavior based on the acquired observations of one or more of the one or more vehicles on the road. The one or more edge devices can be configured to determine an impact of the classified behavior on a connected vehicle. The one or more edge devices can be configured to send an alert about the impact to the impacted connected vehicle.

In still another respect, the subject matter described herein relates to an edge-assisted alert computer program product. The computer program product can include a non-transitory computer readable storage medium having program code embodied therein. The program code executable by a processor to perform a method. The method can include acquiring, by an edge device, observations from one or more connected vehicles or one or more roadside units about one or more vehicles on a road. The method can include classifying, using the edge device, a behavior based on the acquired observations of one or more of the one or more vehicles on the road. The method can further include determining, using the edge device, an impact of the classified behavior on a connected vehicle. The method can include sending, using the edge device, an alert about the impact to the impacted connected vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 8 is an example of an RSU-based method.

DETAILED DESCRIPTION

Figure 1:
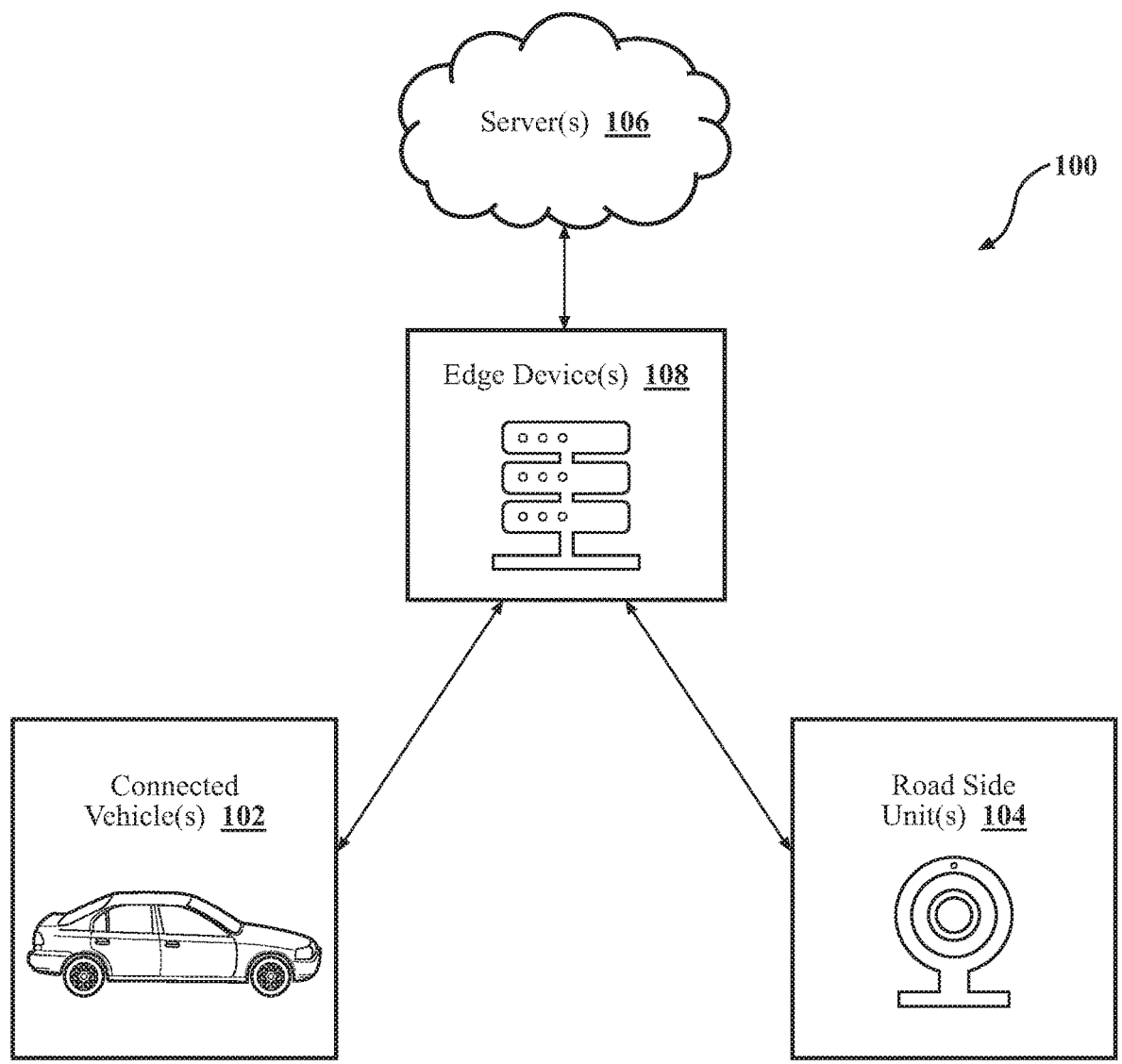
FIG. 1 is an example of an edge-assisted alert system.

A human driver can make driving decisions based on the driver's observations of the environment and in some cases, with the assistance from vehicle-based technologies such as blind-spot detection using vehicle-based sensors. However, while the driver's observation of the environment and the vehicle sensors are limited to an observable range, the driving decisions can be affected by events occurring beyond the observable range of the driver and the vehicle sensors. Moreover, information about some of these events may not be readily observable, such as the fact that a vehicle being driven by a driver with a history of tailgating or other aggressive driving behaviors. Further, processing observations in the environment to make driving decisions can require a significant amount of computational power, beyond the capability of a vehicle.

Arrangements presented herein are directed to an edge device. The edge device can identify the behavior of vehicles on a road and, if a connected vehicle is impacted by the behavior, send an alert detailing the impact to the connected vehicle. A connected vehicle is a vehicle that {01180143} 3 is communicatively coupled to the edge device. Observations (in the form of sensor data) of at least a portion of the road or driving environment can be acquired using one or more sensors. As used herein, "observation" means information about an object. The observation can be in any suitable format, such as images, video, audio, and/or text. The sensors can be located in one or more connected vehicles and/or on one or more roadside infrastructures such as roadside units. The observations from the connected vehicles and/or roadside units can be sent to the edge device. The edge device can extract unique vehicle identifiers from the observations, identifying vehicle detected in the observations. The edge device can request and receive historical data about a vehicle (such as driver's driving style, outstanding driving infractions, etc.) from a server. Based on the received historical data and observations, the edge device can classify the behavior of vehicles detected and identified in the received observations. Behaviors can be classified in any suitable manner. Examples of behaviors can include aggressive driving, collision avoidance, emergency vehicle, etc. The edge device can determine whether a connected vehicle may be impacted by the behavior and how the connected vehicle is impacted. Based on the impact to the connected vehicle, the edge device can send an alert to the connected vehicle. The alert can describe the specific impact of the behavior on the specific connected vehicle. The edge device does not send alerts to non-connected vehicles or to connected vehicles that are not impacted.

Arrangements described herein can provide information to connected vehicles. The information can include an alert about vehicles that can be beyond the observable range of the driver and vehicle sensors of the connected vehicle but can affect driving decisions of the driver of the connected vehicle. The alert is vehicle specific. In other words, an alert describing how a specific vehicle can be impacted can be sent to the specific vehicle. The alert can be based at least partly on information not presently observable to a vehicle or a vehicle driver, such as driving history. Processing information to determine the behavior of surrounding vehicles, the vehicle-specific impact of the behavior on each connected vehicle, and to generate an alert customized to each connected vehicle can require computation power exceeding the computational capability of a vehicle. The edge device can provide computational ability and capability to process the aforementioned information and output alerts to connected vehicles as needed.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-11, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of an edge-assisted alert (EAA) system 100 is shown. The EAA system 100 can include various elements, which can be communicatively connected in any suitable form. As an example, the elements can be connected as shown in FIG. 1. Some of the possible elements of the EAA system 100 are shown in FIG. 1 and will now be described. It will be understood that it is not necessary for the EAA system 100 to have all of the elements shown in FIG. 1 or described herein. The EAA system 100 can have any combination of the various elements shown in FIG. 1. Further, the EAA system 100 can have additional elements to those shown in FIG. 1. In some arrangements, the EAA system 100 may not include one or more of the elements shown in FIG. 1. Further, it will be understood that one or more of these elements can be physically separated by large distances.

The elements of the EAA system 100 can be communicatively linked through one or more communication networks. As used herein, the term "communicatively linked" can include direct or indirect connections through a communication channel or pathway or another component or system. A "communication network" means one or more components designed to transmit and/or receive information from one source to another. The one or more of the elements of the EAA system 100 can include and/or execute suitable communication software, which enables the various elements to communicate with each other through the communication network and perform the functions disclosed herein.

The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

The EAA system 100 can include one or more connected vehicles 102. As used herein, "vehicle" means any form of motorized transport. In one or more implementations, the vehicle can be an automobile. While arrangements will be described herein with respect to automobiles, it will be understood that embodiments are not limited to automobiles. In some implementations, the vehicle can be a watercraft, an aircraft or any other form of motorized transport. The connected vehicle 102 is a vehicle that is communicatively coupled to one or more components of the EAA system 100. As such, a non-connected vehicle is a vehicle that is not communicatively coupled to one or more components of the EAA system 100.

In one or more arrangements, the connected vehicle 102 can be an autonomous vehicle. As used herein, "autonomous vehicle" means a vehicle that configured to operate in an autonomous operational mode in which one or more computing systems are used to navigate and/or maneuver the vehicle along a travel route with minimal or no input from a human driver. In one or more arrangements, the connected vehicle 102 can be highly automated or completely automated.

The connected vehicle 102 can have a plurality of autonomous and/or semi-autonomous operational modes. The connected vehicle 102 can have a manual operational mode in which all of or a majority of the navigation and/or maneuvering of the connected vehicle 102 is performed by a human driver. In one or more arrangements, the connected vehicle 102 can be a conventional vehicle that is configured to operate in only a manual mode. The connected vehicle 102 can be configured to be switched between the various operational modes, including between any of the above-described operational modes.

The connected vehicle 102 can provide observations, e.g., sensor data detected by one or more sensors on the connected vehicle 102, to the edge device 108.

The EAA system 100 can include one or more roadside units (RSUs) 104. The RSU 104 can include roadside infrastructure such as traffic control lights. The RSU 104 can provide observations (e.g., data acquired by one or more sensors of or associated with an RSU) to one or more edge devices 108.

The EAA system 100 can include one or more servers 106. The server 106 can be a cloud server. The server 106 can communicate with one or more edge devices 108 and can distribute information alerts between edge devices 108. The server 106 can include one or more processors, one or more data stores (which can be accessed by the edge devices 108), and one or more communication modules.

The EAA system 100 can include one or more edge devices 108. As used herein, "edge device" means a device with computational and storage capacity that can provide a connection between servers 106, RSUs 104 and connected vehicles 102 over a communication module such as vehicle-to-infrastructure (V2I) communications. The edge device 108 can receive observations from connected vehicles 102 and RSUs 104, and can generate alerts based on the observations as well as data retrieved from the server 106.

The various elements of the EAA system 100 will be discussed in turn below in connections with FIGS. 2-5. It will be understood that it is not necessary for these elements to have all of the sub-elements shown in FIGS. 2-5 or described herein. Further, there can be additional sub-elements to those shown in FIGS. 2-5. Further, while the various sub-elements may be shown as being located on or within the associate element in FIGS. 2-5, it will be understood that one or more of these sub-elements can be located external to the associated element or even remote from the associated element.

Figure 2:
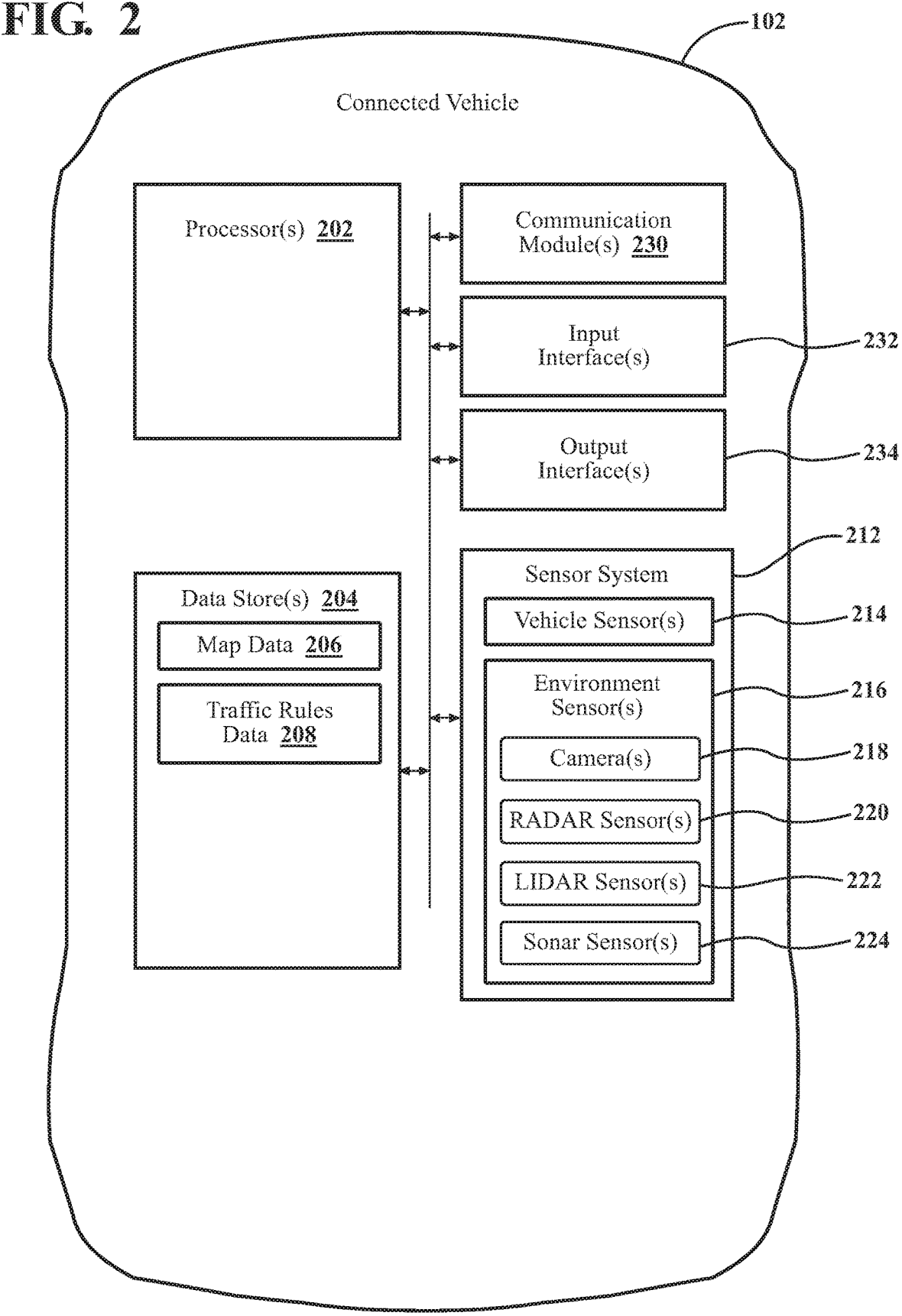
FIG. 2 is an example of a connected vehicle.

Referring to FIG. 2, an example of a connected vehicle 102 is shown. The connected vehicle 102 can include one or more processors 202. "Processor" means any component or group of components that are configured to execute any of the processes described herein or any form of instructions to carry out such processes or cause such processes to be performed. The processor(s) 202 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 202 can include at least one hardware circuit (e.g., an integrated circuit) configured to carry out instructions contained in program code. In arrangements in which there is a plurality of processors 202, such processors can work independently from each other or one or more processors can work in combination with each other. In one or more arrangements, one or more processors 202 can be a main processor(s) of the vehicle. For instance, one or more processors 202 can be electronic control unit(s) (ECU).

The connected vehicle 102 can include one or more data stores 204 for storing one or more types of data. The data store 204 can include volatile and/or non-volatile memory. Examples of suitable data stores 204 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 204 can be a component of the processor(s) 202, or the data store 204 can be operatively connected to the processor(s) 202 for use thereby. The term "operatively connected," as used throughout this description, can include direct or indirect connections, including connections without direct physical contact.

In one or more arrangements, the one or more data stores 204 can include map data 206. The map data 206 can include maps of one or more geographic areas. In some instances, the map data 206 can include information or data on roads, traffic control devices, road markings, street lights, structures, features, and/or landmarks in the one or more geographic areas. The map data 206 can be in any suitable form. In some instances, the map data 206 can include aerial views of an area. In some instances, the map data 206 can include ground views of an area, including 360 degree ground views. The map data 206 can include measurements, dimensions, distances, positions, coordinates, and/or information for one or more items included in the map data 206 and/or relative to other items included in the map data 206. The map data 206 can include a digital map with information about road geometry. In one or more arrangement, the map data 206 can include information about the ground, terrain, roads, surfaces, and/or other features of one or more geographic areas. The map data 206 can include elevation data in the one or more geographic areas. The map data 206 can define one or more ground surfaces, which can include paved roads, unpaved roads, land, and other things that define a ground surface. The map data 206 can be high quality and/or highly detailed.

In one or more arrangements, the one or more data stores 204 can include traffic rules data 208. As used herein, "traffic rule" is any law, rule, ordinance or authority that governs the operation of a motor vehicle, including motor vehicles in motion and motor vehicles that are parked or otherwise not in motion. The traffic rules data 208 can include data on instances, situations, and/or scenarios in which a motor vehicle is required to stop or reduce speed. The traffic rules data 208 can include speed limit data. The traffic rules can be international, federal, national, state, city, township and/or local laws, rules, ordinances and/or authorities. The traffic rules data 208 can include data on traffic signals and traffic signs.

The connected vehicle 102 can include a sensor system 212. The sensor system 212 can include one or more sensors. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

The sensor system 212 can include one or more vehicle sensors 214. The vehicle sensor(s) 214 can detect, determine, assess, monitor, measure, quantify and/or sense information about the connected vehicle 102 itself (e.g., position, orientation, speed, etc.). Alternatively or in addition, the sensor system 212 can include one or more environment sensors 216 configured to detect, determine, assess, monitor, measure, quantify, acquire, and/or sense driving environment data. "Driving environment data" includes and data or information about the external environment in which a vehicle is located or one or more portions thereof. For example, the one or more environment sensors 216 can detect, determine, assess, monitor, measure, quantify, acquire, and/or sense obstacles in at least a portion of the external environment of the connected vehicle 102 and/or information/data about such obstacles. Such obstacles may be stationary objects and/or dynamic objects. The one or more environment sensors 216 can detect, determine, assess, monitor, measure, quantify, acquire, and/or sense other things in the external environment of the connected vehicle 102, such as, for example, lane markers, signs, traffic lights, traffic signs, lane lines, crosswalks, curbs proximate the connected vehicle 102, off-road objects, etc.

In one or more arrangements, the environment sensors 216 can include one or more cameras 218, one or more radar sensors 220, one or more LiDAR sensors 222, and/or one or more sonar sensors 224. Such sensors can be used to detect, determine, assess, monitor, measure, quantify, acquire, and/or sense, directly or indirectly, something about the external environment of the connected vehicle 102. For instance, one or more of the environment sensors 216 can be used to detect, determine, assess, monitor, measure, quantify, acquire, and/or sense, directly or indirectly, the presence of one or more vehicles in the external environment of the connected vehicle 102, the position or location of each detected vehicle relative to the connected vehicle 102, the distance between each detected vehicle and the connected vehicle 102 in one or more directions (e.g. in a longitudinal direction, a lateral direction, and/or other direction(s)), the elevation of each detected vehicle, the speed of each detected vehicle and/or the movement of each detected vehicle.

The connected vehicle 102 can include one or more communication modules 230. A "communication module" refers to a component designed to transmit and/or receive information from one source to another. The one or more communication modules 230 transmit and/or receive information via one or more communication networks. The communication network can include an internal vehicle communication network as well as an external communication network.

The internal vehicle communication network can include a bus in the connected vehicle 102 such as a controller area network (CAN) or the like, and/or other wired and/or wireless mechanisms. The elements of the vehicle such as the data store 204, the sensor system 212, and the processor 202 may be communicatively linked to each other through the internal vehicle communication network. As used herein, the term "communicatively linked" can include direct or indirect connections through a communication channel or pathway or another component or system. Each of the elements of the connected vehicle 102 can include and/or execute suitable communication software, which enables the various elements to communicate with each other through the communication network and perform the functions disclosed herein.

The external communication network represents one or more mechanisms by which the connected vehicle 102 may communicate with other components in the EAA system 100, e.g., other connected vehicles, external servers, edge devices and/or road side units.

The connected vehicle 102 can include one or more input interfaces 232. An "input interface" includes any device, component, system, element or arrangement or groups thereof that enable information/data to be entered into a machine. The input interface(s) 232 can receive an input from a user (e.g., a person) or other entity. Any suitable input interface(s) 232 can be used, including, for example, a keypad, display, touch screen, multi-touch screen, button, joystick, mouse, trackball, microphone, gesture recognition (radar, lidar, camera, or ultrasound-based), and/or combinations thereof.

The connected vehicle 102 can include one or more output interfaces 234. An "output interface" includes any device, component, system, element or arrangement or groups thereof that enable information/data to be presented to a user (e.g., a person) or other entity. The output interface(s) 234 can present information/data to a user or other entity. The output interface(s) 234 can include a display, an earphone, haptic device, and/or speaker. Some components of the connected vehicle 102 may serve as both a component of the input interface(s) 232 and a component of the output interface(s) 234.

The connected vehicle 102 can send information to the edge device 108. The information can include observations detected by the sensor system 212 and/or vehicle information such as vehicle model, vehicle type, etc.

Figure 3:
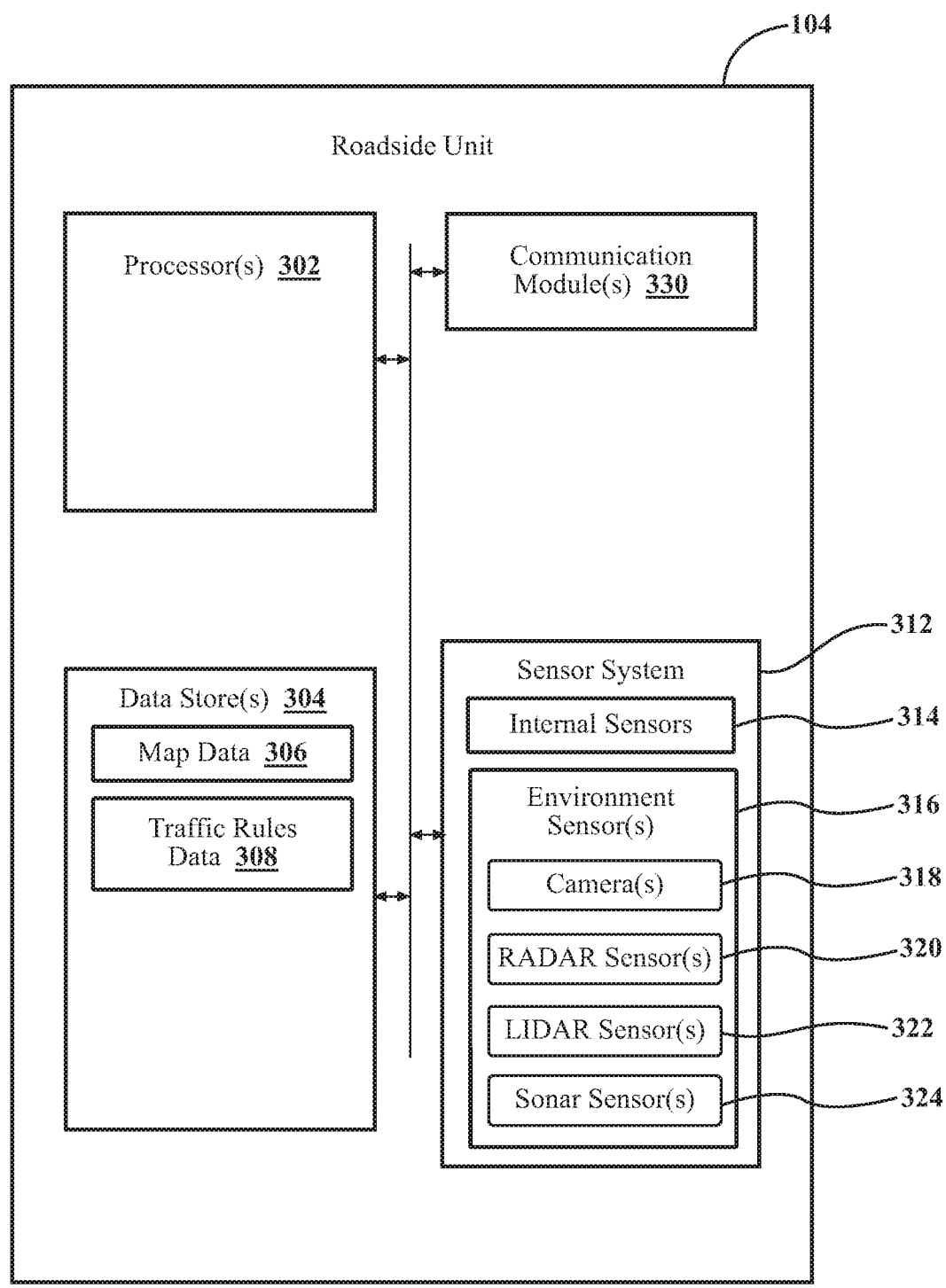
FIG. 3 is an example of a roadside unit (RSU).

Referring to FIG. 3, an example of a roadside unit (RSU) 104 is shown. The RSU 104 can include one or more processors 302, one or more data stores 304, one or more sensor systems 312, and one or more communication modules 330. The above description of the processors 202, the data stores 204, the sensor systems 212, and the communication modules 230 apply equally to the processors 302, the data stores 304, the sensor systems 312, and the communications modules 330, respectively.

Similar to the connected vehicles 102 and as previously mentioned, the RSUs 104 can send information to the edge device 108. The information can include observations detected by the sensor system 312 and/or RSU information such as RSU location, RSU type, etc.

Figure 4:
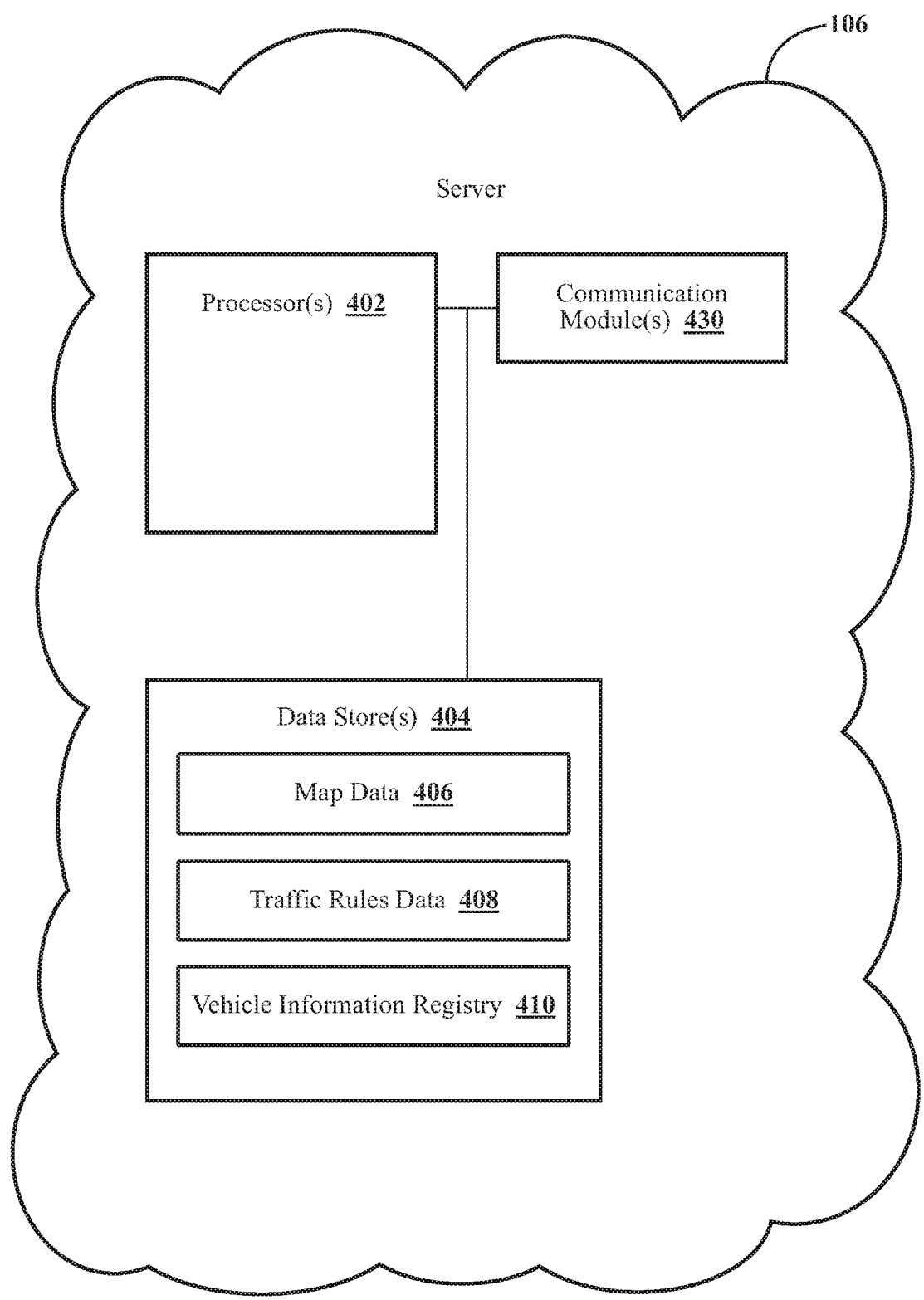
FIG. 4 is an example of a server.

Referring to FIG. 4, an example of a server 106 is shown. The server 106 can include one or more processors 402, one or more data stores 404, and one or more communication modules 430. The above description of the processors 202 and the communication modules 230 apply equally to the processors 402 and the communications modules 430 respectively, and will not be described further to avoid redundancy.

The data store 404 in the server 106 can include map data 406 and traffic rules data 408, similar to the map data 206, 306 and traffic rules data 208, 308 described above. In addition, the data store 404 in the server 106 can further include a vehicle information registry 410 in which vehicle and driver profiles are stored. For instance, a data entry in the vehicle information registry 410 can include a vehicle license plate number, vehicle identification number (VIN), a vehicle type, a vehicle brand, a vehicle model, vehicle owner's name and address, a driving record for the vehicle owner which can include any driving violations, and/or a vehicle service history. The data in the vehicle information registry 410 can be high quality and/or highly detailed.

The server 106 can send information to the edge device 108 and/or allow access to information by the edge device 108. In some instances, the server 106 can send information in response to a request from the edge device 108. As an example, the request from the edge device 108 can include a vehicle license plate number and a request for a driving record associated with the vehicle license plate number. In response to the request, the server 106 can send driving record(s) of one or more drivers associated with the vehicle having the vehicle license plate number, or the server 106 can allow the edge device 108 to access such information.

The server 106 can send information received from other edge devices 108. The information can include observations received and/or alerts generated by the other edge devices 108.

Figure 5:
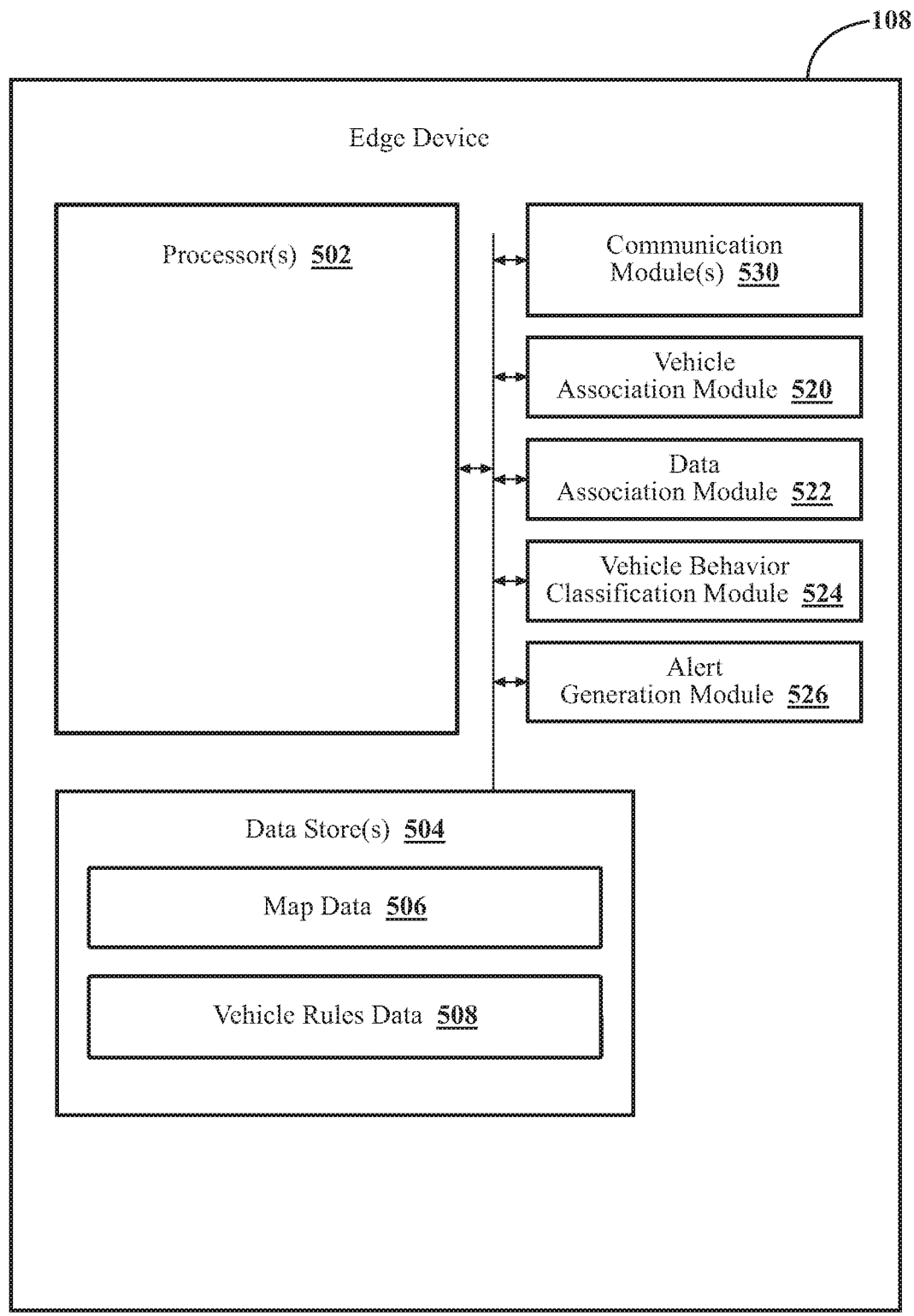
FIG. 5 is an example of an edge device.

Referring to FIG. 5, an example of an edge device 108 is shown. The edge device 108 can include one or more processors 502, one or more data stores 504, and one or more communication modules 530. The above description of the processors 202, the data stores 204, and the communication modules 230 apply equally to the processors 502, the data stores 504, and the communications modules 530 respectively, and will not be described further to avoid redundancy.

The edge device 108 can include one or more modules, at least some of which will be described herein. The modules can be implemented as computer readable program code that, when executed by a processor, implement one or more of the various processes described herein. One or more of the modules can be a component of the processor(s) 502, or one or more of the modules can be executed on and/or distributed among other processing systems to which the processor(s) 502 is operatively connected. The modules can include instructions (e.g., program logic) executable by one or more processor(s) 502. Alternatively or in addition, one or more data stores 504 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In one or more arrangements, the edge device 108 can include a vehicle association module 520, a data association module 522, a vehicle behavior classification module 524, and/or an alert generation module 526.

The vehicle association module 520 can associate observations with a unique identifier for detected vehicles (connected and non-connected). The vehicle association module 520 can receive observations from the connected vehicle(s) 102 and/or the RSU(s) 104. The vehicle association module 520 can process the received observations to extract a unique identifier for the detected vehicle related to the observations. In other words, a unique identifier can be determined for the vehicle. As an example, the vehicle association module 520 can receive observations in image format and can use image recognition techniques to identify the unique identifier for a vehicle, such as a license plate number, within the received observations. Further, the vehicle association module 520 can use any suitable machine learning techniques to determine the unique identifier for a vehicle. The vehicle association module 520 can identify a vehicle using the vehicle's unique identifier, tag a received observation pertaining to the identified vehicle with the vehicle's unique identifier, and/or output the vehicle's unique identifier to the data association module 522.

The data association module 522 can retrieve data related to an identified vehicle from the server 106 via the communications module 530. The data association module 522 can receive a vehicle's unique identifier from the vehicle association module 520. The data association module 522 can transmit the unique identifier to the server 106, requesting data about the identified vehicle. In response to the request, the server 106 can transmit vehicle-related data associated with the identified vehicle, or the server 106 can make such information available for access by the edge device 108. The vehicle-related data can include a driving history of the identified vehicle such as a history of speeding, dangerous driving, tailgating vehicle driving behavior, and observations of the identified vehicle from other edge devices 108 that have been shared with the server 106.

The vehicle behavior classification module 524 can classify the behavior of an identified vehicle based on the observations received by the edge device 108 and/or the vehicle-related data received from the server 106. For instance, where the observation includes a speed of the identified vehicle, the vehicle behavior classification module 524 can retrieve the speed limit of the road from the traffic rules data 508 and compare the speed of the identified vehicle to the speed limit for the road. In the case where the identified vehicle's speed exceeds the speed limit, the vehicle behavior classification module 524 can classify the identified vehicle as driving fast and exceeding the speed limit.

In another instance, the received observations can include a video of the identified vehicle in a first lane at a first timestamp, a second lane at a second timestamp, back to the first lane at a third timestamp, and back to the second lane at a fourth timestamp. The received observations can further include the identified vehicle's speed and direction of travel. The vehicle behavior classification module 524 can determine, based on the time difference between the first, second, third, and fourth timestamps being below a predetermined time period threshold, the identified vehicle's speed being above a predetermined speed threshold, and the identified vehicle's direction of travel, that the identified vehicle is switching out of and back into a lane. Based on that determination, the vehicle behavior classification module 524 can classify the identified vehicle as driving aggressively or erratically.

In another instance, the vehicle behavior classification module 524 can use observations associated with different vehicles to classify the identified vehicle. As an example, the vehicle behavior classification module 524 can determine that the identified vehicle swerves from its lane before a specific location. The vehicle behavior classification module 524 can further determine that other identified vehicles swerve out of the lane before the same location. Based on such a determination, the vehicle behavior classification module 524 can classify an identified vehicle as avoiding a collision. In such a case, there may be a pothole, debris, or a stalled vehicle at the specific location.

The vehicle behavior classification module 524 can use image recognition, audio recognition, and/or machine learning techniques to classify vehicle behaviors. Further, the vehicle behavior classification module 524 can reinforce its classification or re-classify a vehicle behavior as the vehicle behavior classification module 524 receives more data. As an example, the vehicle behavior classification module 524 can classify the identified vehicle as driving aggressively based on the identified vehicle swerving between lanes and having a history of dangerous driving. As another example, the vehicle behavior classification module 524 can classify the identified vehicle as being a service vehicle such as an ambulance or a police vehicle, where the identified vehicle is travelling at a high speed and an image of the identified vehicle shows a flashing siren on top of the identified vehicle. The vehicle behavior classification module 524 can output the classified vehicle behavior to the alert generation module 526.

The alert generation module 526 can determine possible resulting impacts of the classified vehicle behavior on a connected vehicle 102. The alert generation module 526 can receive classified vehicle behavior from the vehicle behavior classification module 524, and based on the received classified vehicle behavior, the alert generation module 526 can determine or predict one or more impacts of a classified vehicle behavior (individually or as a group) on surrounding vehicles, specifically any proximate connected vehicles 102. The alert generation module 526 can use machine learning techniques, traffic analysis, traffic modeling, and/or any suitable techniques, now known or later developed, to determine or predict the impact of the classified vehicle behavior.

The alert generation module 526 can identify a proximate connected vehicle 102. The alert generation module 526 can determine the position of a connected vehicle 102 based on data received from the connected vehicle(s) 102, the RSU(s) 104, and/or the server 106. The alert generation module 526 can determine whether the connected vehicle 102 is proximate to the classified vehicle behavior, whether the connected vehicle 102 will be impacted by the classified vehicle behavior, and how a connected vehicle 102 is specifically affected by the classified vehicle behavior. As an example, two connected vehicles 102 are travelling on a two lane road, a first connected vehicle 102 in a first lane and a second connected vehicle 102 in a second lane, where the first lane has a pothole. The alert generation module 526 can receive a classified vehicle behavior of avoiding a pothole at a specific location on the first lane from the vehicle behavior classification module 524. Based on that classified vehicle behavior and the positions of the connected vehicles 102 relative to the specific location, the alert generation module 526 can determine that the first connected vehicle 102 will be affected by the pothole, as the first connected vehicle 102 is driving in the first lane towards the pothole and can choose to swerve into the second lane to avoid the pothole. The alert generation module 526 can further determine that the second connected vehicle 102 can be affected by the first connected vehicle 102 swerving into the second lane to avoid the pothole.

The alert generation module 526 can communicate with a connected vehicle 102, outputting the impact of a classified vehicle behavior on a connected vehicle to the related connected vehicle. In other words, the alert generation module 526 can transmit a vehicle-specific alert to a connected vehicle 102 via the communication module 530, detailing the specific impact of a classified vehicle behavior on the connected vehicle 102. As an example, in the case described above where the alert generation module 526 identifies the first connected vehicle 102 as being affected by the pothole, the alert generation module 526 can send an alert to the first connected vehicle 102, indicating that there is a pothole ahead on the first connected vehicle's lane. The alert generation module 526 can also send a similar alert to any connected vehicles 102 in the first lane that may encounter the pothole. The alert generation module 526 can send an alert to the second connected vehicle 102 in the second lane indicating that a vehicle (which may be connected or non-connected) from the first lane may swerve into the second connected vehicle's lane at the location of the pothole. The alert can be presented in the connected vehicle 102 in any suitable manner, such as visual, audial, and/or haptic.

The edge device 108 can receive observations from one or more connected vehicles 102 and/or one or more RSUs 104 about detected vehicles (both connected and non-connected vehicles) on a road. The connected vehicles 102 and/or RSUs 104 may send information to the edge device 108 continuously, periodically, upon request from the edge device 108, randomly, or in any other suitable manner.

Now that the various potential systems, devices, elements and/or components of the 100 have been described, various methods will now be described. Various possible steps of such methods will now be described. The methods described may be applicable to the arrangements described above in relation to FIGS. 1-5, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 6:
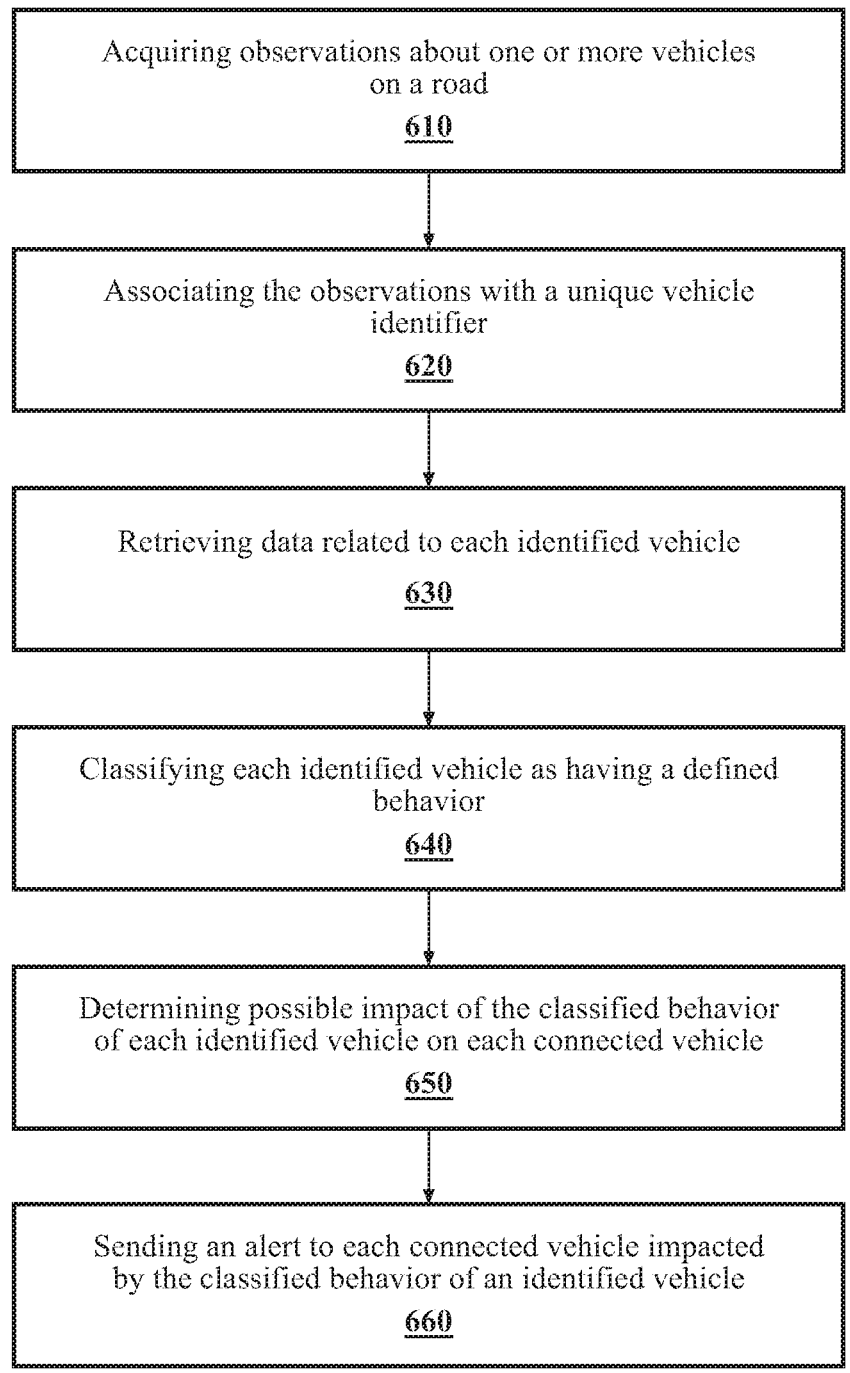
FIG. 6 is an example of an edge-assisted alert method.

Referring now to FIG. 6, an example of an edge-assisted alert method 600 is shown.

At block 610, observations about one or more vehicles on a road can be acquired by an edge device 108. The observations can be acquired from one or more connected vehicles 102 and/or one or more RSUs 104. The connected vehicle(s) 102 and/or the RSU(s) 104 can detect one or more vehicles on the road and can transmit information about the detected vehicles to the edge device 108. In other words, the edge device 108 can receive information about detected vehicles on the road from one or more connected vehicles 102, one or more RSUs 104, or any combination thereof. The connected vehicles 102 and/or RSUs can send information to the edge device 108 continuously, periodically, upon request from the edge device 108, randomly, or at any suitable time and/or in any suitable manner. The edge device 108 may receive the information via the communication network. The method 600 can continue to block 620.

At block 620, acquired observations can be associated with a unique vehicle identifier for each vehicle detected in the acquired observations. More specifically and as previously mentioned, the edge device 108 or the vehicle association module 520 can associate observations with the unique identifier for a detected vehicle (connected and non-connected). The method 600 can continue to block 630.

At block 630, data related to each identified vehicle can be retrieved by the edge device 108 from the server 106. More specifically and as previously mentioned, the data association module 522 can retrieve data related to an identified vehicle from the server 106. The method 600 can continue to block 640.

At block 640, an identified vehicle can be classified as having a defined behavior by the edge device 108. More specifically and as previously mentioned, the vehicle behavior classification module 524 can classify each identified vehicle as having a defined behavior based on the observations received by the edge device 108 and/or the vehicle-related data received from the server 106. The method 600 can continue to block 650.

At block 650, possible impacts of the classified behavior of each identified vehicle on a connected vehicle 102 can be determined by the edge device 108. More specifically and as previously mentioned, the alert generation module 526 can determine possible resulting impacts of the classified vehicle behavior of each identified vehicle on each connected vehicle 102. The method 600 can continue to block 660.

At block 660, an alert can be sent to the connected vehicle(s) 102 impacted by the classified behavior of an identified vehicle. More specifically and as previously mentioned, the alert generation module 526 can generate an alert for and send an alert to a specific connected vehicle 102 based on the impact of the classified behavior of the identified vehicles on the specific connected vehicle 102. The driver of the connected vehicle 102 can decide whether to change the operation of the connected vehicle 102 based on the alert. The edge device 108 does not send alerts to non-connected vehicles. Further, the edge device 108 does not send alerts to connected vehicle(s) 102 that are not impacted by the classified behavior of the identified vehicle(s). The method 600 can end. Alternatively, the method 600 can return to block 610 or some other block.

Figure 7:
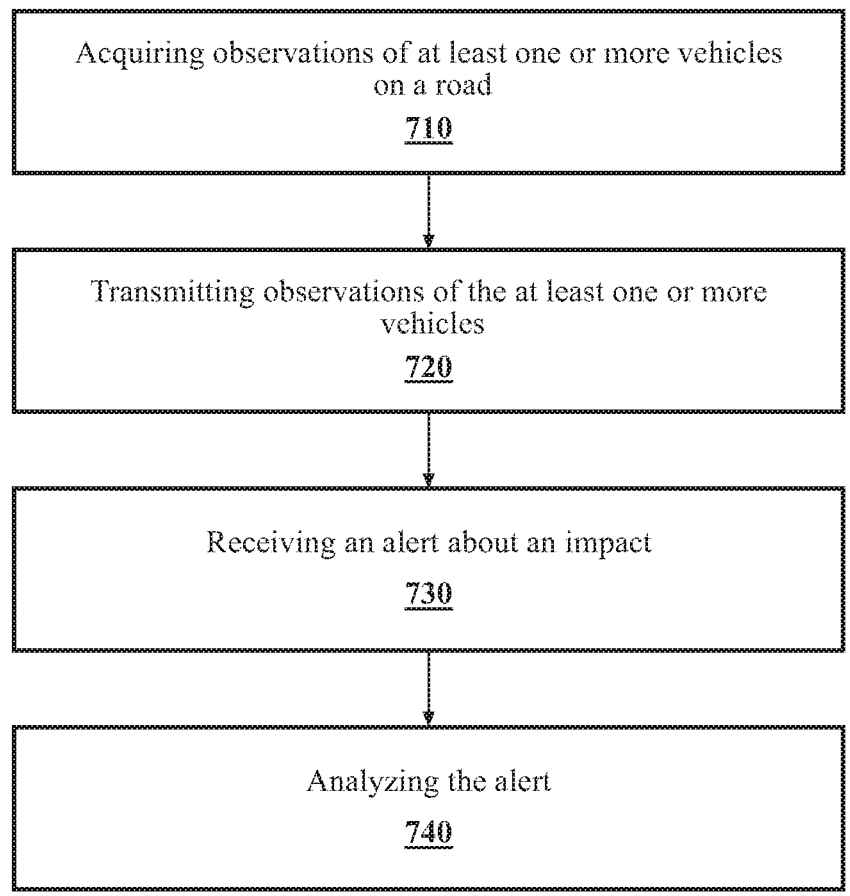
FIG. 7 is an example of a vehicle-based method.

Referring now to FIG. 7, an example of a connected vehicle-based method 700 is shown.

At block 710, observations of at least one or more vehicles on a road can be acquired by a connected vehicle 102 using one or more sensors. Such acquiring can be performed by one or more of the vehicle sensors 214 and/or the environment sensors 216 of the connected vehicle 102. As an example, the vehicle sensor(s) 214, the camera(s) 218, the radar sensor(s) 220, the LiDAR sensor(s) 222, the sonar sensor(s) 224, or any combination thereof can be used to acquire observations. Observations can include information about the connected vehicle 102, such as the position, velocity, and/or acceleration of the connected vehicle. Observations can further include information about vehicles proximate to the connected vehicle 102, such as each proximate vehicle's position, velocity, acceleration, color, model type, etc. In some instance, one or more vehicles can be detected based on the observations. For instance, the acquired observations can be analyzed by the sensor system 212, the processor(s) 202, and/or one or more modules(s) to detect one or more vehicles on the road.

In some instance, the detected vehicles can be identified based on the acquired observations. For instance, in addition to detecting one or more vehicles on the road, the acquired observations can be analyzed by the sensor system 212, the processor(s) 202, and/or one or more other modules(s) to identify the detected vehicles. Further, identifying features of detected vehicles can be perceived using at least in part a characteristic associated with the detected vehicles such as a license plate number, a vehicle brand and model. The processor(s) 202, and/or other module(s) can determine the license plate number relative to known or predicted information about the license plates. In some arrangements, the detected vehicles may not be identified. The method 700 can continue to block 720.

At block 720, observations of the at least one or more vehicles can be transmitted by the connected vehicle 102. The observations can be transmitted from the connected vehicle 102 to the edge device 108. For instance, the connected vehicle 102 can send observations of vehicles that include a license plate number, brand, model, color, speed, and direction of travel to the edge device 108. The observations can include raw data for processing off board the connected vehicle 102. The method 700 can end or continue to block 730.

At block 730, an alert about an event can be received by the connected vehicle 102. The alert can be received by the connected vehicle 102 from the edge device 108. For instance and as mentioned above, the edge device 108 can send an alert to the connected vehicle 102 about an event that affects the connected vehicle 102. The alert can include details about the event such as the event being a pothole, or a driver/vehicle behavior such as a vehicle driving dangerously or an emergency vehicle heading to an emergency. The alert may further include details about the relevant vehicles causing or otherwise involved in the event such as the license plate number, the vehicle brand and model. The method 700 can continue to block 740.

At block 740, the alert message can be analyzed by the connected vehicle 102. In other words, upon receiving an alert message from the edge device 108 that includes an event and identifying information for detected vehicles causing the event, the connected vehicle 102 may determine how to respond to the alert message. In one instance, the connected vehicle 102 can detect and monitor the vehicles identified in the alert message. As another instance and in the case where the edge device 108 transmits an alert message identifying the event as a pothole or debris on the road, the connected vehicle 102 can monitor for the pothole or debris on the road. The connected vehicle 102 can adjust its driving, e.g., the vehicle may slow down, speed up, and/or change lanes based on its analysis of the alert message and/or its perception of its environment. Alternatively, the connected vehicle 102 may not analyze or respond to the alert message and may not adjust its driving.

The method 700 can end. Alternatively, the method 700 can return to block 710 or some other block.

Referring to FIG. 8, an example of an RSU-based method 800 of detecting one or more vehicles using RSU sensors and communicating with the edge device is shown. The blocks in method 800 may be executed in an order different than that described herein.

At block 810, observations of at least one or more vehicles on a road can be acquired by an RSU 104. The RSU 104 can acquire observations using one or more sensors such environment sensor(s) 316 as well as from other infrastructure such as traffic light controls. Observations can include information about the RSU 104 such as the position of the RSU 104, information about vehicles proximate to the RSU 104, such as each proximate vehicle's position, velocity, acceleration, color, model type, etc. At least one or more vehicles can be detected based on the observations. For instance, the acquired observations can be analyzed by the sensor system 312, the processor(s) 302, and/or one or more modules(s) to detect one or more vehicles on the road. The method 800 can continue to block 820.

At block 820, observations about the one or more identified vehicles can be transmitted to the edge device 108. For instance, the RSU 104 can send observations of the identified vehicles that include an observed vehicle's license plate number, brand, model, color, speed, and direction of travel to the edge device 108.

The method 800 can end. Alternatively, the method 800 can return to block 810 or some other block.

Figure 9:
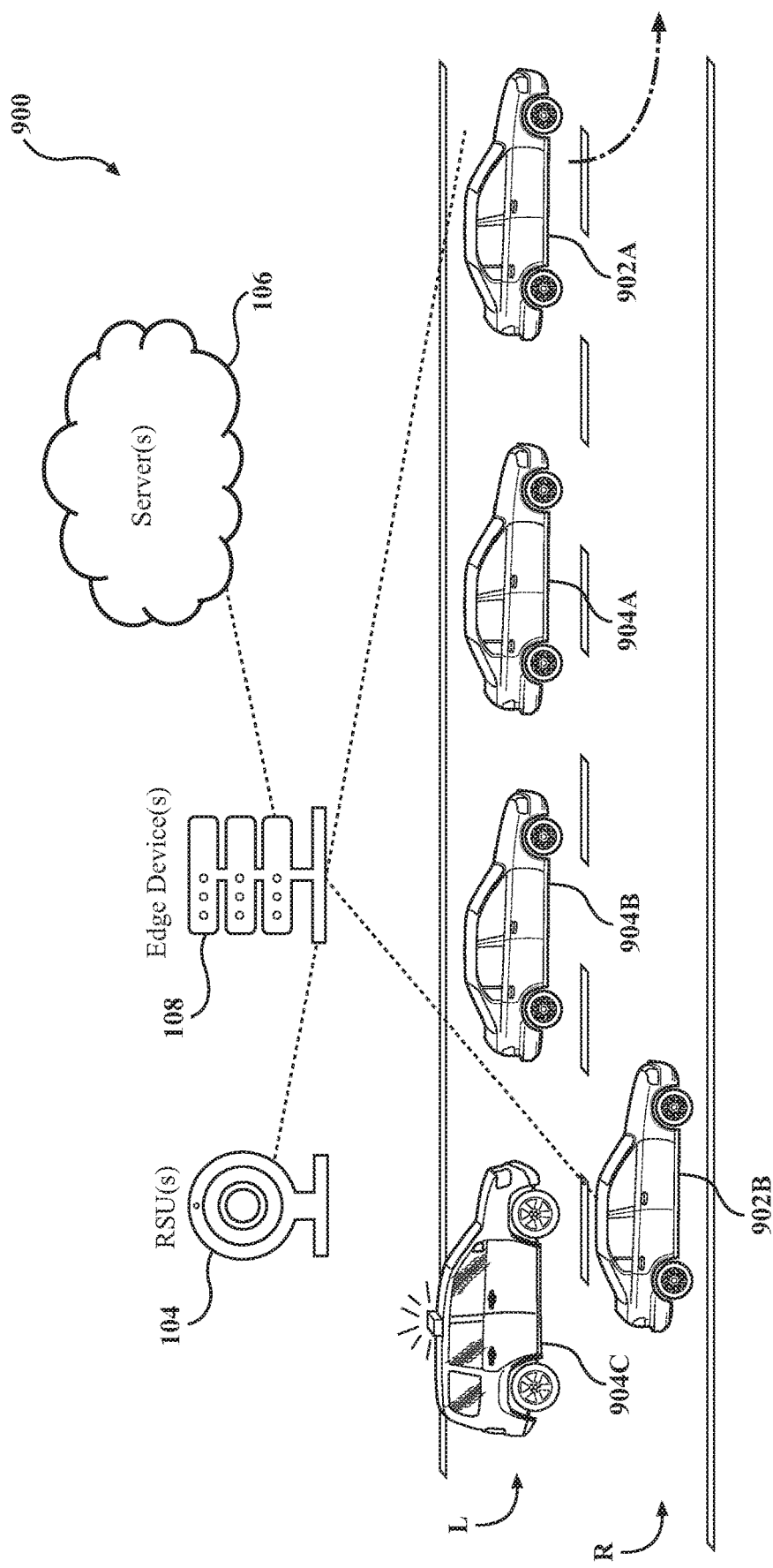
FIG. 9 is an example of a driving scenario with an emergency vehicle.

A non-limiting example of the operation of the EAA system 100 and/or one or more of the methods will now be described in relation to FIG. 9. FIG. 9 shows an example of a driving scenario with an emergency vehicle. Referring to FIG. 9, a first connected vehicle 902A and a second connected vehicle 902B can be traveling in an environment 900. The first connected vehicle 902A is travelling in a left lane L and the second connected vehicle 902B is travelling in a right lane R. There can be one or more RSUs 104 distributed along or near the road. There can also be one or more edge devices 108 in the environment 900. For this example, an emergency vehicle 904C is approaching, and there are two non-connected vehicles 904A, 904B in front of the emergency vehicle 904C and behind the first connected vehicle 902A.

The second connected vehicle 902B and the RSU 104 can use one or more sensors of their respective sensor systems 212, 312 to acquire observations of at least a portion of the environment 900. As an example, the second connected vehicle 902B can acquire observations of the approaching vehicle 904C in the form of visual data using one or more cameras 218. As another example, the RSU 104 can acquire observations of the approaching vehicle 904C in the form of LiDAR data using one or more LiDAR sensors 322.

The second connected vehicle 902B and the RSU 104 can transmit their observations of the approaching vehicle 904C to the edge device 108. The edge device 108 can extract a unique vehicle identifier (such as a license plate number) from the received observations and can associate the observations with the unique identifier. In one instance, the edge device 108 can request data from the server 106 based on the unique identifier. The server 106 can access the data store 404, specifically the vehicle information registry 412. The server 106 can determine that the approaching vehicle 904C is a service vehicle, specifically an emergency vehicle, based on its license plate number. The server 106 can transmit data to the edge device 108 indicating that the approaching vehicle 904C is an emergency vehicle. Accordingly, the edge device 108 can classify the approaching vehicle 904C as an emergency vehicle. Additionally and/or as an alternative, the edge device 108 can classify the behavior of the approaching vehicle 904C using one of or a combination of the observations received from the second connected vehicle 902B and the RSU 104. As an example, the edge device 108 can apply image recognition techniques on observations in video and image format to identify a flashing siren on the roof of the approaching vehicle 904C, and based on the flashing siren, the edge device 108 can classify the approaching vehicle 904C as an emergency vehicle.

The edge device 108 can determine the impact of the emergency vehicle on surrounding vehicles 902A, 902B, 904A, 904B. Based on observations received from the connected vehicles 902A, 902B and the RSU 104, the edge device 108 can identify the positions of the surrounding vehicles, both the connected vehicle(s) and the non-connected vehicle(s). Using machine learning techniques or any suitable processing, predictive, or modeling techniques, the edge device 108 can the impact of an emergency vehicle 904C on each surrounding vehicle 902A, 902B, 904A, 904B.

The edge device 108 can identify the position of first connected vehicle 902A as in the same lane as and in front of the emergency vehicle 904C, and can send an alert to the first connected vehicle 902A such as "Emergency vehicle approaching from behind".

Upon receiving an alert message from the edge device, the first connected vehicle 902A can change lanes from lane L to lane R. In anticipation of the first connected vehicle 902A changing lanes, the edge device 108 can also send an alert to the second connected vehicle 902B stating "Vehicles in left lane may switch into your lane".

The alerts from the edge device 108 to the connected vehicles 902A, 902B can allow the two connected vehicles 902A, 902B to react to the emergency vehicle 904C before the non-connected vehicles 904A, 904B.

Figure 10:
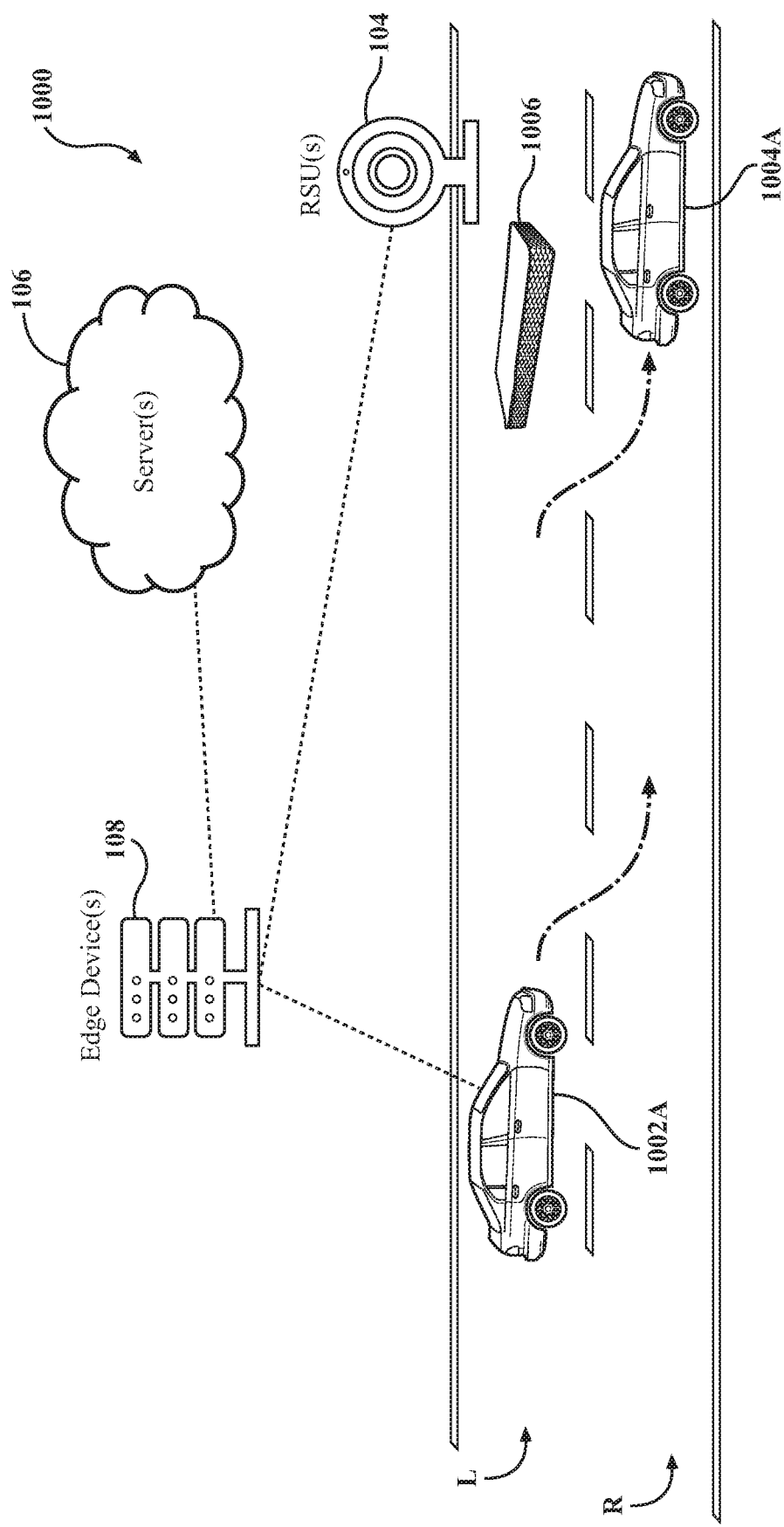
FIG. 10 is an example of a driving scenario with a road debris hazard.

Another non-limiting example of the operation of the EAA system 100 and/or one or more of the methods will now be described in relation to FIG. 10. An example of a driving scenario with a road debris hazard will now be described in relation to FIG. 10. Referring to FIG. 10, a non-connected vehicle 1004 and a connected vehicle 1002 are travelling in an environment 1000. Both the non-connected vehicle 1004 and the connected vehicle 1002 are travelling in a left lane L. There can be one or more roadside units 104 and one or more edge devices 108 distributed along the environment 1000. For this example, there is a large piece of debris 1006 in the left lane L and the two vehicles 1002, 1004 are approaching the large piece of debris 1006.

The RSU 104 can use one or more sensors of their respective sensor systems 312 to acquire observations of at least a portion of the environment 1000. For instance, the RSU 104 can acquire observations in the form of visual data using one or more cameras 318. As another example, the RSU 104 can acquire observations in the form of LiDAR data using one or more LiDAR sensors 322. The acquired visual data and LiDAR data can be analyzed by the RSU 104.

The RSU 104 can transmit its observations of the non-connected vehicle 1004 changing lanes to the edge device 108. The edge device 108 can extract a unique identifier for the non-connected vehicle 1004 such as a license plate number from the observations. The edge device 108 can request the driving history of the vehicle associated with the license plate number from the server 106. Based on the request, the server 106 can transmit and the edge device 108 can receive the driving history of the non-connected vehicle 1004, which can indicate that the driver has no traffic violations and does not have a habit of driving dangerously, and so, the lane change was deliberate and not dangerous driving. Further, the edge device 108 can compare the lane change to various stored driving maneuvers and can determine that the non-connected vehicle's behavior is consistent with a collision avoidance maneuver. Based on such an analysis, the edge device 108 can classify the non-connected vehicle 1004 as avoiding a collision.

Upon classifying the non-connected vehicle 1004 as avoiding a collision in the left lane L, the edge device 108 can determine that vehicles travelling in the left lane L towards the location that was avoided by the non-connected vehicle 1004 will have to change lanes to avoid a collision.

Based on the determined impact and identifying the connected vehicle 1002, the edge device 108 can send an alert to the connected vehicle 1002 such as "Vehicles avoiding collision ahead".

Figure 11:
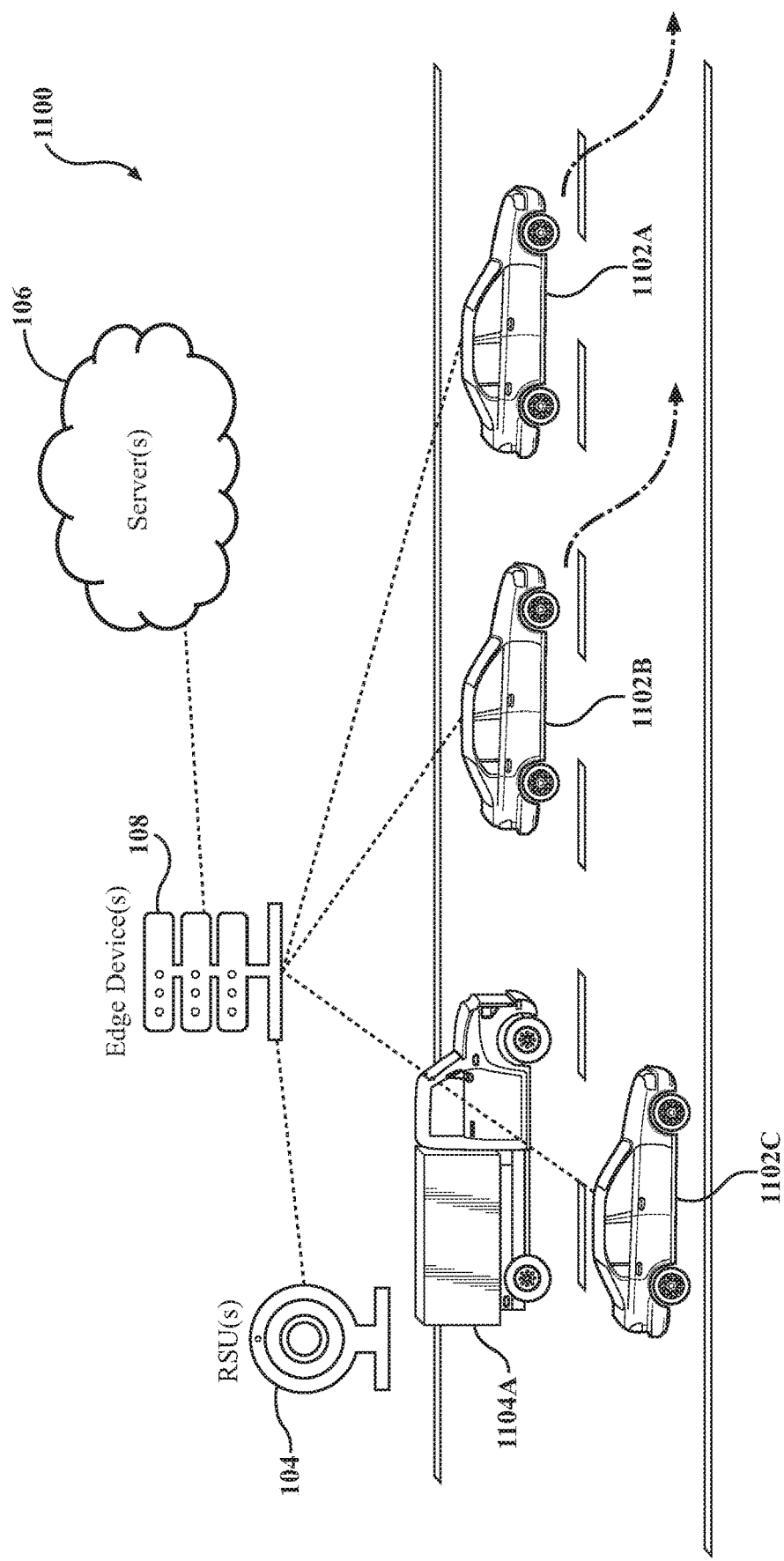
FIG. 11 is an example of a driving scenario with an aggressive driver.

Yet another non-limiting example of the operation of the EAA system 100 and/or one or more of the methods will now be described in relation to FIG. 11. An example of a driving scenario with an aggressive driver will now be described in relation to FIG. 11. Referring to FIG. 11, three connected vehicles 1102A, 1102B, 1102C can be traveling in an environment 1100. For instance, a first connected vehicle 1102A and a second connected vehicle 1102B can be traveling in a left lane L, and a third connected vehicle 1102C can be travelling a right lane R. There can be one or more RSUs 104 and one or more edge devices 108 distributed along the environment 1100. For this example, there is a vehicle 1104 (which may or may not be connected) driving aggressively in the left lane L and approaching the first and second connected vehicles 1102A, 1102B.

The third connected vehicle 1102C and the RSU 104 can use one or more sensors of their respective sensor systems 212, 312 to acquire observations of at least a portion of the environment 1100. As an example, the third connected vehicle 1102C can acquire observations in the form of visual data using one or more cameras 218. As another example, the RSU 104 can acquire LiDAR data using one or more LiDAR sensors 152.

The connected vehicle 1102C and the RSU 104 can transmit their observations of the detected vehicle 1104 driving aggressively (e.g., speeding, tailgating) to the edge device 108. The edge device 108 can extract a unique identifier for the detected vehicle 1104 such as a license plate number from the observations. The edge device 108 can request the driving history of the detected vehicle 1104 associated with the license plate number from the server 106. Based on the request, the server 106 can transmit and the edge device 108 can receive the driving history of the vehicle 1104, which can indicate that the driver has outstanding traffic violations and has a habit of driving dangerously. Based on at least one or more of the detected vehicle's speed of travel, the driver's driving record, the distance between the detected vehicle 1104 and neighboring vehicles, the edge device 108 can classify the detected vehicle 1104 as driving aggressively.

Upon classifying the detected vehicle 1104 as driving aggressively, the edge device 108 can determine that the connected vehicles 1102A, 1102B in front of the dangerous driving vehicle 1104 will have to make way for the vehicle 1104, and can send an alert to the connected vehicles 1102A such as "Aggressively driven vehicle approaching from behind".

The alert from the edge device 108 to the connected vehicles 1102A, 1102B, 1102C can allow the three connected vehicles 1102A, 1102B, 1102C to react to the aggressively driven vehicle early.

It will be appreciated that arrangements described herein can provide numerous benefits, including one or more of the benefits mentioned herein. For example, arrangements described herein can result in alert determination bases on object detection beyond the observable range of the driver and the vehicle sensors and driving history retrieval. Arrangements described herein can provide data processing at a large scale in real time on edge devices with the results of the data processing (determined alerts) being sent to connected vehicles. When arrangements described herein are used in connection with an autonomous vehicle and/or a semi-autonomous vehicle, the performance and/or safe operation of the vehicle can be facilitated. Arrangements described herein can provide human drivers with important information about the external environment.

The flowcharts and block diagrams in the figures illustrate the architecture, functionality, and operation of possible implementations of systems, methods and computer program products according to various embodiments. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, e.g., stored, thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by or in connection with an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object oriented programming language such as Java™ Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. An edge-assisted alert method, the method comprising:
acquiring, by an edge device, observations from one or more connected vehicles or one or more roadside units about one or more vehicles on a road;
classifying, using the edge device, a behavior based on the acquired observations about the one or more vehicles on the road;
determining, using the edge device, whether a connected vehicle will be impacted by the classified behavior;
determining, using the edge device, how the connected vehicle will be impacted by the classified behavior; and
sending, using the edge device, an alert about how the connected vehicle will be impacted by the classified behavior to the connected vehicle.

2. The edge-assisted alert method of claim 1, wherein at least one of the one or more connected vehicles is communicatively connected to the edge device.

3. The edge-assisted alert method of claim 1, further including:
associating, using the edge device, the acquired observations with a unique vehicle identifier for at least one of the one or more vehicles.

4. The edge-assisted alert method of claim 3, further including:
retrieving, from a server, data related to at least of the one or more vehicles associated with a unique vehicle identifier.

5. The edge-assisted alert method of claim 1, wherein classifying the behavior further includes classifying, using the edge device, the behavior based on historical vehicle data.

6. The edge-assisted alert method of claim 1, wherein the behavior is at least one of a collision avoidance maneuver, dangerous driving, or high speed driving.

7. The edge-assisted alert method of claim 1, wherein the behavior is at least one of pothole avoidance maneuver or an emergency vehicle.

8. The edge-assisted alert method of claim 1, further including:
acquiring, using one or more sensors located in the one or more connected vehicles or the one or more roadside units, observations of the one or more vehicles on the road;
sending the observations from the one or more connected vehicles or the one or more roadside units to the edge device; and
receiving the alert about the impact from the edge device.

9. An edge-assisted alert system, the system comprising:
at least one of one or more connected vehicles or one or more roadside units;
an edge device operatively connected to the at least one of the one or more connected vehicles and the one or more roadside units, the edge device configured to:
acquire observations from the one or more connected vehicles or the one or more roadside units about one or more vehicles on a road;
classify a behavior based on the acquired observations about the one or more vehicles on the road;
determine whether a connected vehicle will be impacted by the classified behavior; and
send an alert about how the connected vehicle will be impacted by the classified behavior to the connected vehicle.

10. The edge-assisted alert system of claim 9, wherein the edge device is further configured to:
associate the acquired observations with a unique vehicle identifier for at least one of the one or more vehicles.

11. The edge-assisted alert system of claim 10, wherein the edge device is further configured to:
retrieve, from a server, data related to at least of the one or more vehicles associated with a unique vehicle identifier.

12. The edge-assisted alert system of claim 9, wherein the edge device is further configured to:
classify the behavior based on historical vehicle data.

13. The edge-assisted alert system of claim 9, wherein the behavior is at least one of a collision avoidance maneuver, dangerous driving, or high speed driving.

14. The edge-assisted alert system of claim 9, wherein the behavior is at least one of pothole avoidance maneuver or an emergency vehicle.

15. The edge-assisted alert system of claim 9, wherein the at least one of the one or more connected vehicles is configured to:
acquire, using one or more sensors located in the at least one of the one or more connected vehicles, observations of the one or more vehicles on the road;
send the observations to the edge device; and
receive the alert about the impact from the edge device.

16. An edge-assisted alert computer program product, the computer program product comprising a computer readable storage medium having program code embodied therewith, the program code executable by a processor to perform a method comprising:
acquiring, by an edge device, observations from one or more connected vehicles or one or more roadside units about one or more vehicles on a road;
classifying, using the edge device, a behavior based on the acquired observations about the one or more vehicles on the road;
determining, using the edge device, whether a connected vehicle will be impacted by classified behavior; and
sending, using the edge device, an alert about how the connected vehicle will be impacted by the classified behavior to the connected vehicle.

17. The edge-assisted alert computer program product of claim 16, wherein at least one of the one or more connected vehicles is communicatively connected to the edge device.

18. The edge-assisted alert computer program product of claim 16, wherein the method further includes:
associating, using the edge device, the acquired observations with a unique vehicle identifier for at least one of the one or more vehicles.

19. The edge-assisted alert computer program product of claim 16, wherein the method further includes:
retrieving, from a server, data related to at least of the one or more vehicles associated with a unique vehicle identifier.

20. The edge-assisted alert computer program product of claim 16, wherein classifying the behavior further includes classifying, using the edge device, the behavior based on historical vehicle data.

* * * * *